(12) United States Patent
Voutsas

(10) Patent No.: US 6,686,978 B2
(45) Date of Patent: Feb. 3, 2004

(54) METHOD OF FORMING AN LCD WITH PREDOMINANTLY <100> POLYCRYSTALLINE SILICON REGIONS

(75) Inventor: Apostolos Voutsas, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 75 days.

(21) Appl. No.: 09/796,330

(22) Filed: Feb. 28, 2001

(65) Prior Publication Data

US 2002/0118317 A1 Aug. 29, 2002

(51) Int. Cl.$^7$ ................................................ G02F 1/136
(52) U.S. Cl. ........................... 349/44; 438/486; 438/487
(58) Field of Search ................................ 438/166, 486, 438/487, 30; 257/49; 349/44

(56) References Cited

U.S. PATENT DOCUMENTS

| 5,580,381 | A |   | 12/1996 | Yamagata ................. 117/101 |
| 5,744,824 | A |   | 4/1998  | Kousai et al. ............. 257/74 |
| 5,940,693 | A | * | 8/1999  | Maekawa .................. 438/166 |
| 5,943,560 | A |   | 8/1999  | Chang et al. .............. 438/151 |

(List continued on next page.)

FOREIGN PATENT DOCUMENTS

WO     WO97/45827     12/1997

OTHER PUBLICATIONS

Geis et al., "Crystallographic orientation of silicon on an amorphous substrate using an artificial surface–relief grating and laser crystallization", Applied Physics Letters 35(1), Jul. 1979, pp. 71–74.*

Article entitled, "Laser Crystallization and Structural Characterization of Hydrogenated Amorphous Silicon Thin Films", by D. Toet et al., published in Journal of Applied Physics, vol. 85, No. 11, Jun. 1, 1999, pp 7914–7918.

Article entitled, "Capillary Waves in Pulsed Excimer Laser Crystallized Amorphous Silicon", by D. K. Fork et al., published in Applied Physics Letters, 68(15), Apr. 8, 1996, pp. 2138–2140.

Article entitled, "Controlled Super–Lateral Growth of Si Films for Microstructural Manipulation and Optimization", by J. S. Im, M.A. Crowder, R. S. Sposili, J. P. Leonard, H. J. Kim, J. H. Yoon, V.V. Gupta, H. Jin Song and H. S. Cho, published in Phys. Stat. Sol. (a) 166, 1998, pp. 603–617.

Article entitled, "Phase Transformation Mechanisms Involved in Excimer Laser Crystallization of Amorphous Silicon Films", by J. S. Im, H. J. Kim and M. O. Thompson, published in Apply. Phys. Letter 63 (14), Oct. 4, 1993, pp. 1969–1971.

Article entitled, "Sequential Lateral Solidification of Thin Silicon Films on SiO$_2$", by R. S. Sposili and J. S. Im, published in Appl. Phys. Lett. 69 (19) Nov. 4, 1996, pp. 2864–2866.

*Primary Examiner*—Tarifur R. Chowdhury
*Assistant Examiner*—David Chung
(74) *Attorney, Agent, or Firm*—Matthew D. Rabdau; David C. Ripma; Scott C. Krieger

(57) ABSTRACT

A method is provided to produce liquid crystal displays (LCDs) on polycrystalline films having a single predominant crystal orientation. A layer of amorphous silicon is deposited over a substrate to a thickness suitable for producing a desired crystal orientation. Lateral-seeded excimer laser annealing (LS-ELA) is used to crystallize a region of the amorphous silicon to form a polycrystalline film with a preferred crystal orientation. In an embodiment of the method, the polycrystalline film is polished. A pixel region is formed over a portion of the substrate using either amorphous silicon or polycrystalline silicon. A circuit region is formed over the polycrystalline film.

26 Claims, 7 Drawing Sheets

U.S. PATENT DOCUMENTS

| | | | |
|---|---|---|---|
| 5,960,323 A | 9/1999 | Wakita et al. | 438/795 |
| 5,993,538 A * | 11/1999 | Asakawa et al. | 117/8 |
| 6,108,464 A | 8/2000 | Foresi et al. | 385/14 |
| 6,190,949 B1 * | 2/2001 | Noguchi et al. | 438/149 |
| 6,274,888 B1 * | 8/2001 | Suzuki et al. | 257/72 |
| 6,426,246 B1 * | 7/2002 | Chang et al. | 438/166 |
| 6,521,473 B1 * | 2/2003 | Jung | 438/30 |
| 6,635,555 B2 * | 10/2003 | Voutsas | 438/487 |

* cited by examiner

US 6,686,978 B2

METHOD OF FORMING AN LCD WITH PREDOMINANTLY <100> POLYCRYSTALLINE SILICON REGIONS

BACKGROUND OF THE INVENTION

This invention relates generally to semiconductor technology and more particularly to the method of forming liquid crystal displays (LCDs) having polycrystalline silicon regions within an amorphous silicon film, which overlies a display substrate.

Polycrystalline silicon is formed by crystallizing amorphous silicon films. One method of crystallizing amorphous silicon films is excimer laser annealing (ELA). Conventional ELA processes form polycrystalline films having a random polycrystalline structure. Random, as used here, means that no single crystal orientation is dominant and that polycrystalline structures consist of a mixture of crystallographic orientations in silicon. These crystallographic orientations in silicon are commonly denoted as <111>, <110>, and <100>, along with their respective corollaries, as is well known in the art. Control of crystallographic orientation is generally desirable because the electrical characteristics of a polycrystalline silicon film depend upon the crystallographic orientation of the film. In addition, the uniformity of the electrical characteristics will improve if the majority of the film has a controllable texture.

ELA, as well as many other annealing methods, has not provided a means to control these microstructural characteristics and achieve a predictable and repeatable preferential crystal orientation and film texture within an annealed film.

It would be desirable to have a method of producing LCDs using a polycrystalline silicon film with a more uniform crystallographic orientation. It would also be desirable to be able to produce LCDs using predominantly <100> polycrystalline silicon to form circuit structures or pixel structures.

SUMMARY OF THE INVENTION

Accordingly, a method of forming liquid crystal display (LCD) structures on a substrate, which has a polycrystalline silicon film with a desired predominant crystal orientation, is provided. The method of forming the LCD structures comprises the steps of: providing a substrate, depositing an amorphous silicon film on the substrate, annealing the substrate to produce a polycrystalline film region with the desired predominant crystal orientation, preferably a <100> crystal orientation, forming pixel structures over the amorphous silicon film, and forming circuit structures over a polycrystalline film region.

Pixel structures, as well as, circuit structures include thin film transistors (TFTs), resistors, capacitors, or other structures that are formed using polycrystalline silicon.

The substrate is preferably a transparent substrate such as quartz, glass or plastic.

To achieve a good quality film that is predominantly <100> crystal orientation, the step of depositing the amorphous film should deposit to a thickness of at least approximately 100 nm.

The step of annealing preferably uses a laterally-seeded excimer laser annealing process.

In another embodiment, the pixel region is formed over a polycrystalline silicon film region. In this embodiment, a circuit region need not be present. However, in a preferred embodiment both the pixel region and the circuit region are formed using a polycrystalline silicon film.

In a preferred embodiment, the polycrystalline region is polished to a thickness of less than approximately 60 nm. In some cases due to large substrate size, polishing may not be cost effective. In this case, using a film with a thickness greater than 100 nm will be a suitable compromise.

The method of the present invention, produces a liquid crystal display structure comprising at least one polycrystalline film region, which has a predominantly <100> crystal orientation, overlying a substrate. A pixel region is formed using either amorphous silicon or the at least one polycrystalline film region. In a preferred embodiment, a circuit region is formed using the at least one polycrystalline film region.

DETAILED DESCRIPTION OF THE INVENTION

Figure 1:
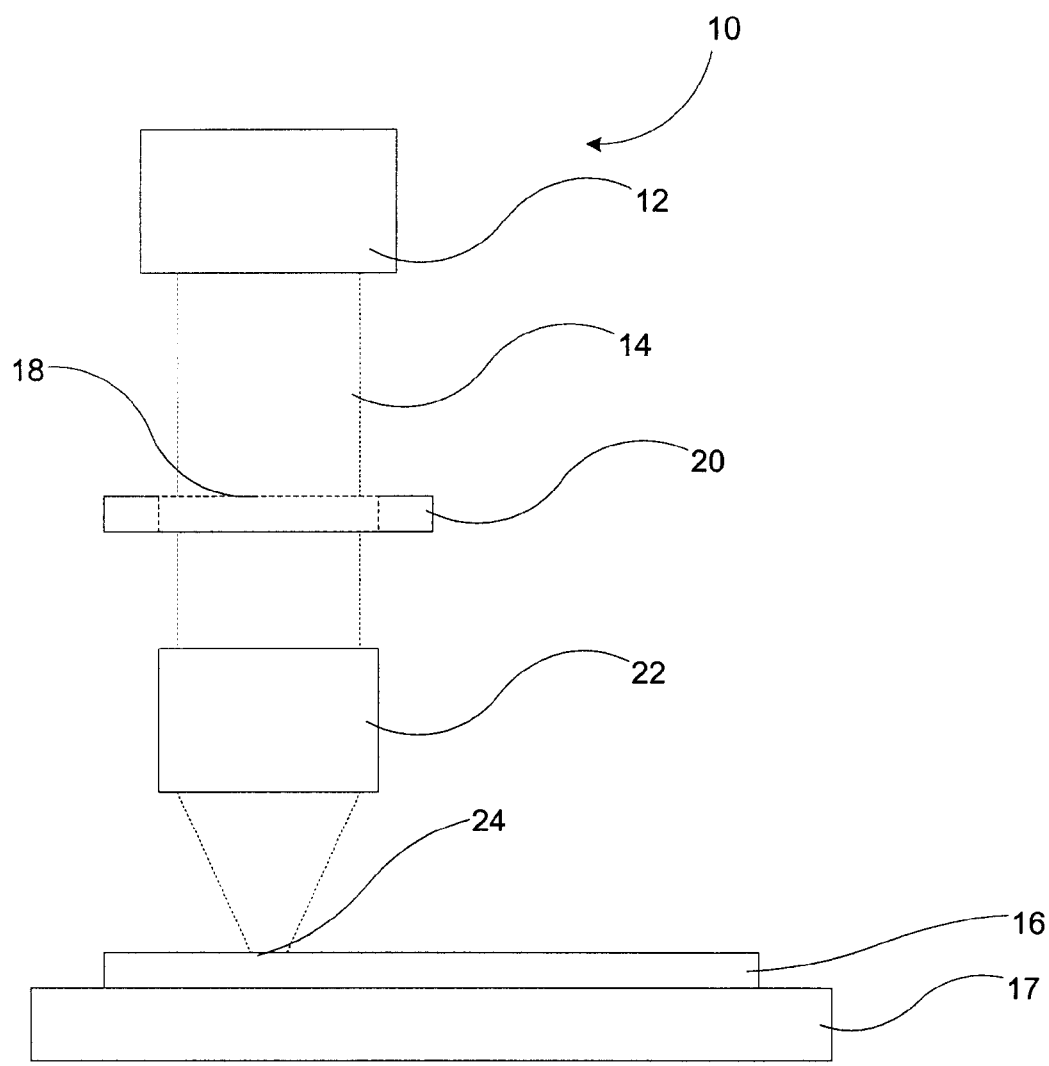
FIG. 1 is a schematic cross-sectional view showing an excimer laser anneal (ELA) apparatus used in connection with the present method.

Referring to FIG. 1 a lateral-seeded excimer laser annealing (LS-ELA) apparatus 10 is shown. LS-ELA apparatus 10 has a laser source 12. Laser source 12 includes a laser (not shown) along with optics, including mirrors and lens, which shape a laser beam 14 (shown by dotted lines) and direct it toward a substrate 16, which is supported by a stage 17. The laser beam 14 passes through a mask 18 supported by a mask holder 20. The laser beam 14 preferably has an output energy in the range of 0.8 to 1 Joule when the mask 18 is 50 mm×50 mm. Currently available commercial lasers such as Lambda Steel 1000 can achieve this output. As the power of available lasers increases, the energy of the laser beam 14 will be able to be higher, and the mask size will be able to increase as well. After passing through the mask 18, the laser beam 14 passes through demagnification optics 22 (shown schematically). The demagnification optics 22 reduce the size of the laser beam reducing the size of any image produced after passing through the mask 18, and simultaneously increasing the intensity of the optical energy striking the substrate 16 at a desired location 24. The demagnification is typically on the order of between 3× and 7× reduction, preferably a 5× reduction, in image size. For a 5× reduction the image of the mask 18 striking the surface at the location 24 has 25 times less total area than the mask, correspondingly increasing the energy density of the laser beam 14 at the location 24.

The stage 17 is preferably a precision x-y stage that can accurately position the substrate 16 under the beam 14. The stage 17 is preferably capable of motion along the z-axis, enabling it to move up and down to assist in focusing or defocusing the image of the mask 18 produced by the laser beam 14 at the location 24. The mask holder 20 is also capable of x-y movement.

Figure 2:
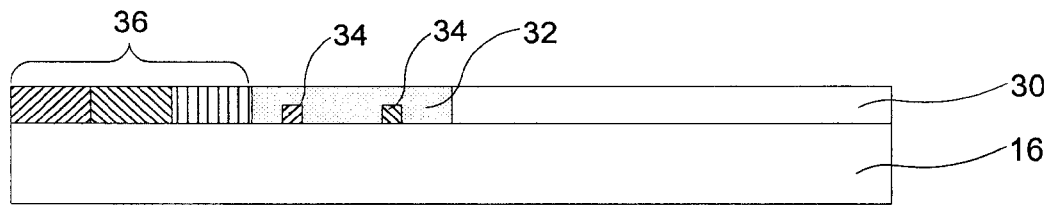
FIG. 2 (prior art) is a cross-sectional view showing polycrystalline film crystallized using an interface-seeded ELA (IS-ELA) process

FIG. 2 illustrates aspects of a prior art ELA process. This process is sometimes referred to as Interface-Seeded ELA (IS-ELA). An amorphous silicon film 30 has been deposited over the substrate 16. A laser pulse is directed at the amorphous silicon film 30, which melts and crystallizes a region 32. The laser pulse melts a region on the order of 0.5 mm. Small microcrystalline seeds 34 remain, or form, at the interface. As the surrounding amorphous silicon crystallizes these seeds affect the crystal orientation. Since the seeds 34 have a variety of crystal orientations, the resulting films will accordingly have a wide mix of crystal orientations. This is illustrated by previously crystallized region 36. In actuality, since a large number of seeds would be present at the interface, a large number of crystal orientations would form.

Figure 3:
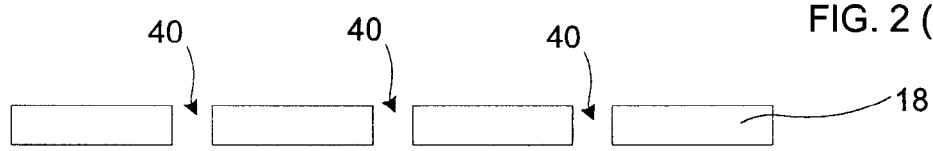
FIG. 3 illustrates a step in the process of lateral-seeded ELA (LS-ELA).
Figure 3:
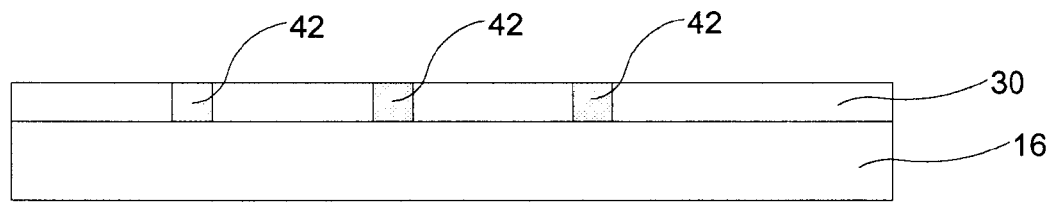
Figure 4:
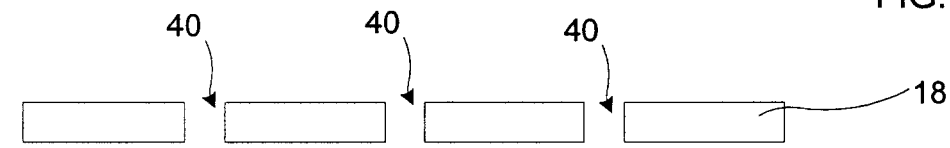
FIG. 4 illustrates a step in the process of lateral-seeded ELA (LS-ELA).
Figure 4:
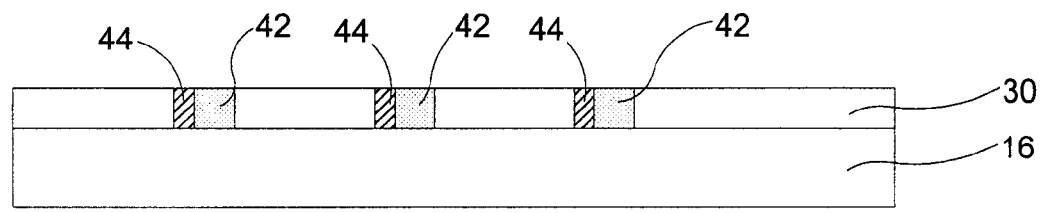
Figure 5:
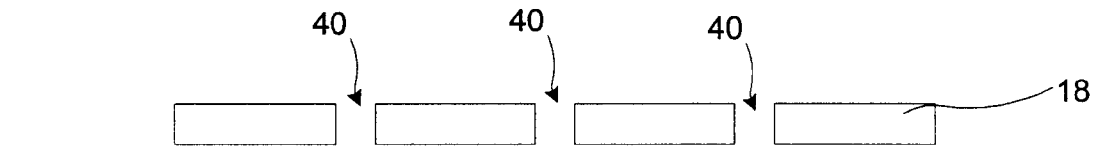
FIG. 5 illustrates a step in the process of lateral-seeded ELA (LS-ELA).
Figure 5:
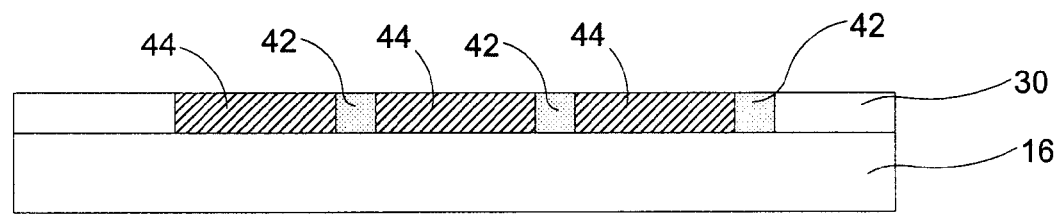

FIGS. 3 through 5 illustrate the steps of Lateral-Seeded ELA (LS-ELA), which is also referred to as Lateral-Growth ELA (LG-ELA) or Lateral Crystallization ELA (LC-ELA). Starting with FIG. 3, the amorphous silicon film 30 has been deposited over the substrate 16. A laser beam pulse has been passed through openings 40 in the mask 18 to form beamlets, which irradiate regions 42 of the amorphous silicon film 30. Each beamlet is on the order of 5 microns wide. This is approximately 100 times narrower than the 0.5 mm used in the prior art IS-ELA process. The small regions 42 are melted and crystallized by the beamlets produced by the laser pulse passing through the mask.

After each pulse the mask 18 is advanced by an amount not greater than half the lateral crystal growth distance. A subsequent pulse is then directed at the new area. By advancing the image of the openings 40 a small distance, the crystals produced by preceding steps act as seed crystals for subsequent crystallization of adjacent material. Referring now to FIG. 4, the irradiated regions 42 have moved slightly. The previously crystallized regions 44 act as the seed crystal for the crystallization of the irradiated regions 42. By repeating the process of advancing the mask laterally and firing short pulses the crystal is effectively pulled in the direction of the advancing laser pulses.

FIG. 5 shows the amorphous silicon film 30 after several additional pulses following FIG. 4. The crystals have continued to grow in the direction of the masks' movement to form a polycrystalline region. The mask will preferably advance until each opening 40 reaches the edge of a polycrystalline region formed by the opening immediately preceding it. To crystallize larger regions, the stage 17, which was described in reference to FIG. 1, can be moved, and the mask 18 repositioned, to continue crystallizing the amorphous silicon film 30 until a region of the desired size has been crystallized.

This LS-ELA process produces crystallized regions that are more uniform, due to the propagation of a first crystallized region by subsequent laser pulses, as opposed to crystallized regions formed using multiple seed crystals at the interface. FIGS. 6 through 9 are plots that illustrate the affect of amorphous silicon film thickness on the resulting predominant crystal orientation.

Figure 6:
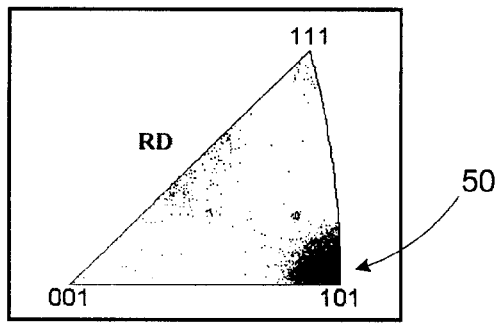
FIG. 6 is a scatter plot of crystal orientations for a 35 nm thick film.

FIG. 6 is a plot of the distribution of crystal orientation for a 30 nm thick deposited amorphous silicon film after LS-ELA processing. FIG. 6 shows that a majority of the crystals are in a 101 region 50. The 101 region 50 corresponds to a <110> crystal orientation.

Figure 7:
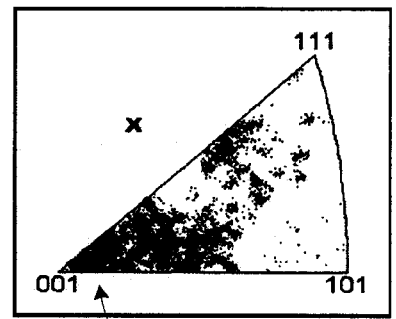
FIG. 7 is a scatter plot of crystal orientations for a 45 nm thick film.

FIG. 7 is a plot of the distribution of crystal orientation for a 45 nm thick deposited amorphous silicon film after LS-ELA processing. FIG. 7 shows that the crystal orientations are spread throughout the orientation plot. This is a less ideal condition for the resulting film. It should be noted that the predominant crystal orientation has shifted away from the <110> orientation toward the <100> orientation region 52, which corresponds to 001 on the plot.

Figure 8:
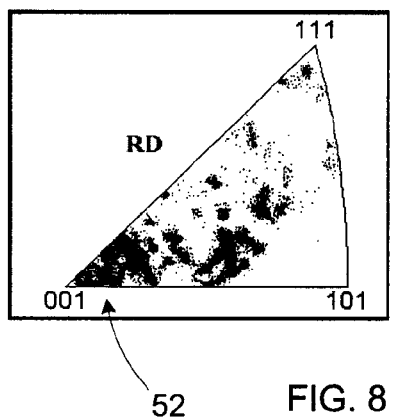
FIG. 8 is a scatter plot of crystal orientations for a 75 nm thick film.

FIG. 8 is a plot of the distribution of crystal orientation for a 75 nm thick deposited amorphous silicon film after LS-ELA processing. FIG. 8 shows that the crystal orientation has moved closer to the <100> orientation. However, the crystal orientation is still spread over a relatively wide range of crystal orientations.

Figure 9:
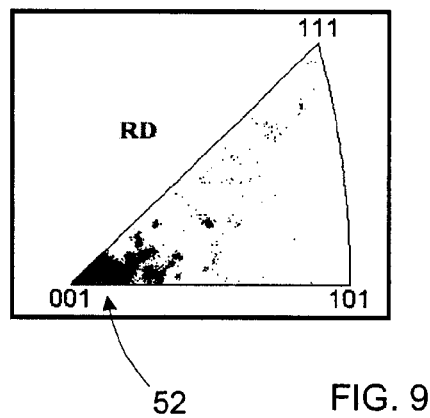
FIG. 9 is a scatter plot of crystal orientations for a 100 nm thick film.

FIG. 9 is a plot of the distribution of crystal orientation for a 100 nm thick deposited amorphous silicon film after LS-ELA processing. FIG. 9 shows that the crystal orientation is now predominantly <100> as shown by the <100> region 52.

Figure 10:
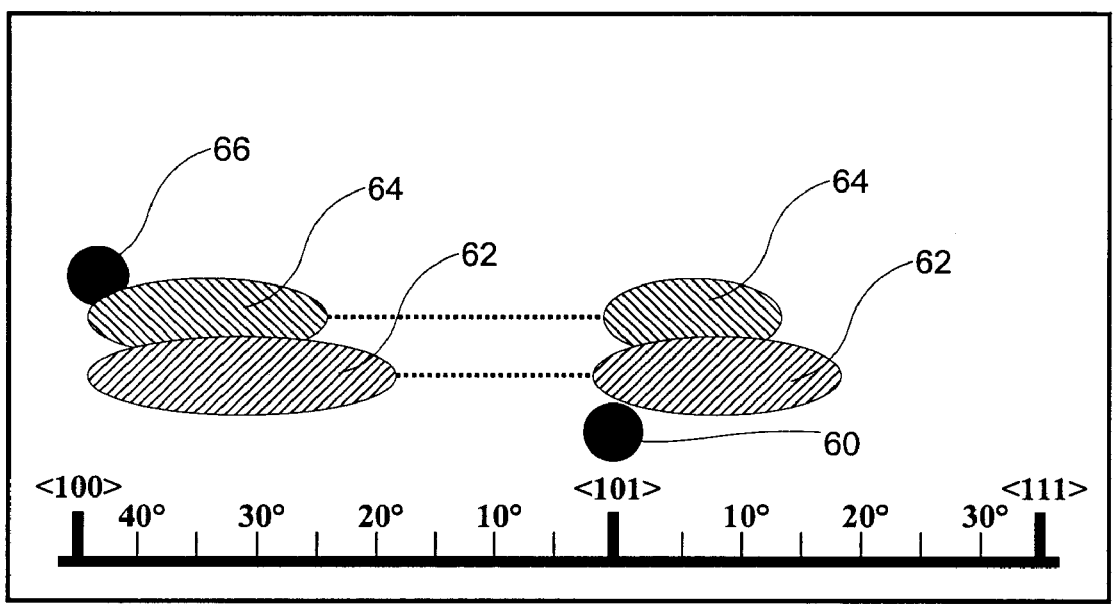
FIG. 10 is a diagram illustrating variation in crystal orientation for various film thicknesses.

FIG. 10 is a diagram illustrating variation in crystal orientation for various film thicknesses. A first thickness 60, which corresponds to an approximately 35 nm thick film, has a <110> orientation to within less than 10 degrees. A second film thickness 62, which corresponds to an approximately 45 nm thick film, has a mix of <100> orientation to within 25 degrees and <101> orientation to within approximately 20 degrees. A third film thickness 64, which corresponds to an approximately 75 nm thick film, has a mix of <100> orientation to within approximately 20 degrees and <101> orientation to within approximately 15 degrees. A forth film thickness 66, which corresponds to an approximately 100 nm thick film, has a <100> orientation to within approximately 10 degrees. As used herein, the term predominant crystal orientation, or any similar phrase, refers to a material that is within less than 15 degrees of a desired crystal orientation. Looking at FIG. 10, it is apparent that it is possible to produce films with predominantly <110> orientation, or <100> orientation. <100> orientation is generally preferred for semiconductor processes because of its electrical properties. Unfortunately, to produce predominantly <100> orientation requires the formation of thicker films than those that generally are considered desirable for the formation of thin film transistors. Thicker films tend to have greater leakage currents than thinner films. In the method of this invention, the compromise is made between leakage current and the desirable electrical properties associated with having predominantly <100> polycrystalline films. While it may be possible to polish the films to produce thinner films, this may not be practical for all applications.

Figure 11:
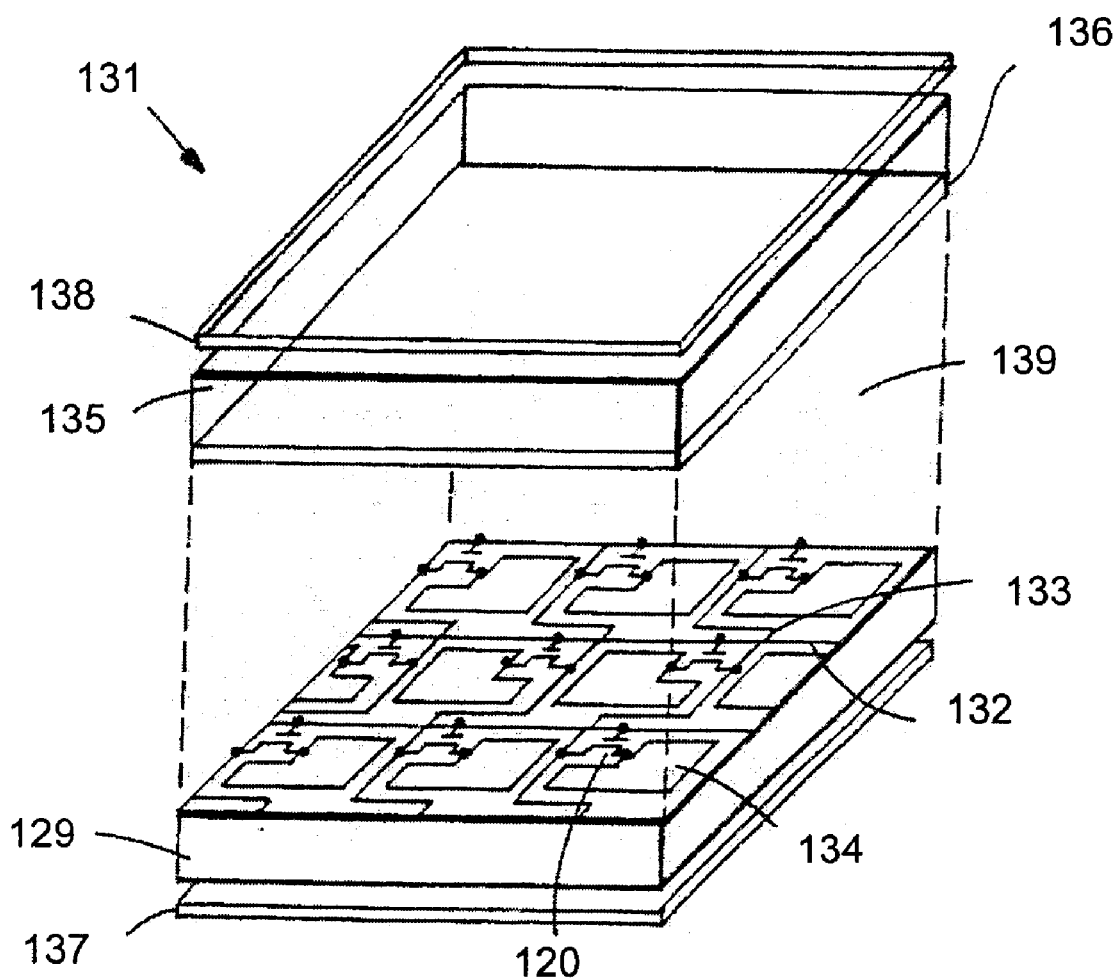
FIG. 11 is an exploded view of an LCD display.

Referring now to FIG. 11, which shows the basic structure of an LCD pixel region. The LCD apparatus 131 includes an insulating substrate 129 made of glass or other suitable material, such as quartz or plastic. A plurality of gate lines 132 running in parallel with each other, and a plurality of source lines 133 crossing the respective gate lines 132 are formed on the insulating substrate 129. Pixel electrodes 134 are disposed at positions adjacent to respective crossings of the gate lines 132 and the source lines 133, thus forming a matrix on the insulating substrate 129. The pixel electrodes 134 are connected to the gate lines 132 and the source lines 133 through the TFTs 120 of this example as switching elements. The LCD apparatus 131 further includes an insulating substrate 135 made of glass of other suitable material, which is disposed so as to oppose the insulating substrate 129. A counter electrode 136 is formed on the inner surface of the insulating substrate 135. The insulating substrates 129 and 135 are attached together, with liquid crystal contained therebetween, thus forming a liquid crystal layer 139 interposed between the pixel electrodes 134 and the counter electrode 136. To the outer surfaces of the thus attached insulating substrates 129 and 135 polarizing plates 137 and 138 adhere.

In addition to the pixel region, LCD apparatus can include a circuit region electrically connected to the pixel region. The circuit region can contain row and column drivers, as well as other integrated circuits. These circuits can be formed using TFTs. The use of the circuit region can reduce, or eliminate, external components that must otherwise be connected to the LCD to drive pixels within the pixel region.

Figure 12:
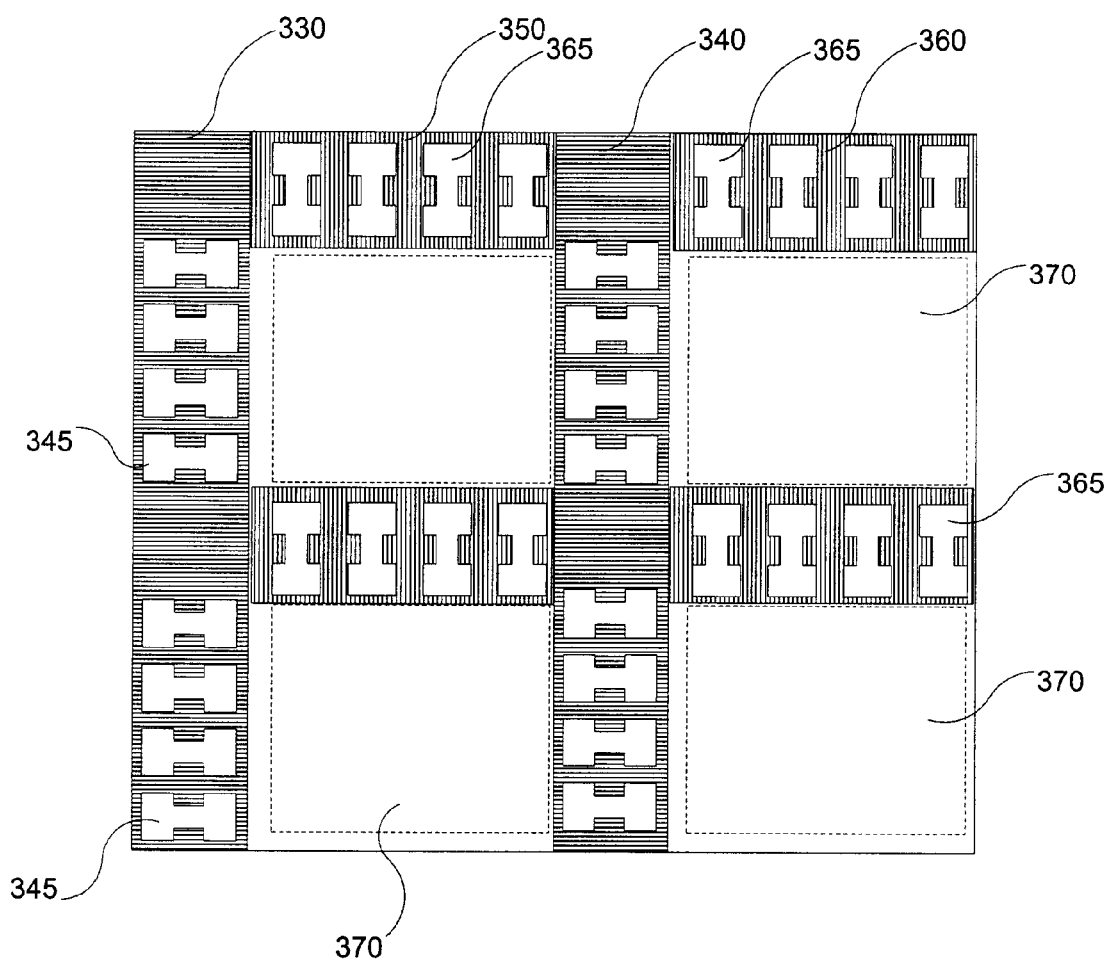
FIG. 12 is a planar view of a substrate with pixel regions and circuit regions.

Once the substrate has been processed to form regions with <100> crystallographic orientation, circuit device elements are formed on the substrate as illustrated in FIG. 12. FIG. 12 is for illustration purposes, and as with the other drawings, is not drawn to scale. Multiple LCDs are shown being formed on a single substrate. The substrate has a first circuit region 330 and a second circuit region 340. The circuit regions are preferably formed using <100> polycrystalline silicon film. A first set of TFTs 345 have been formed within circuit regions 330. These TFTs are shown to illustrate row drivers. Third circuit region 350 and fourth circuit region 360 are shown with a second set of TFTs 365, which illustrate column drivers. Additional sets of TFTs are depicted but not labeled and correspond to row and column drivers, as well.

Since FIG. 12 illustrates an LCD, pixel regions 370 are shown. All or a portion of the pixel regions can be polycrystalline silicon film. Alternatively, the pixel regions can be entirely amorphous silicon that has not been annealed using the LS-ELA process.

Figure 13:
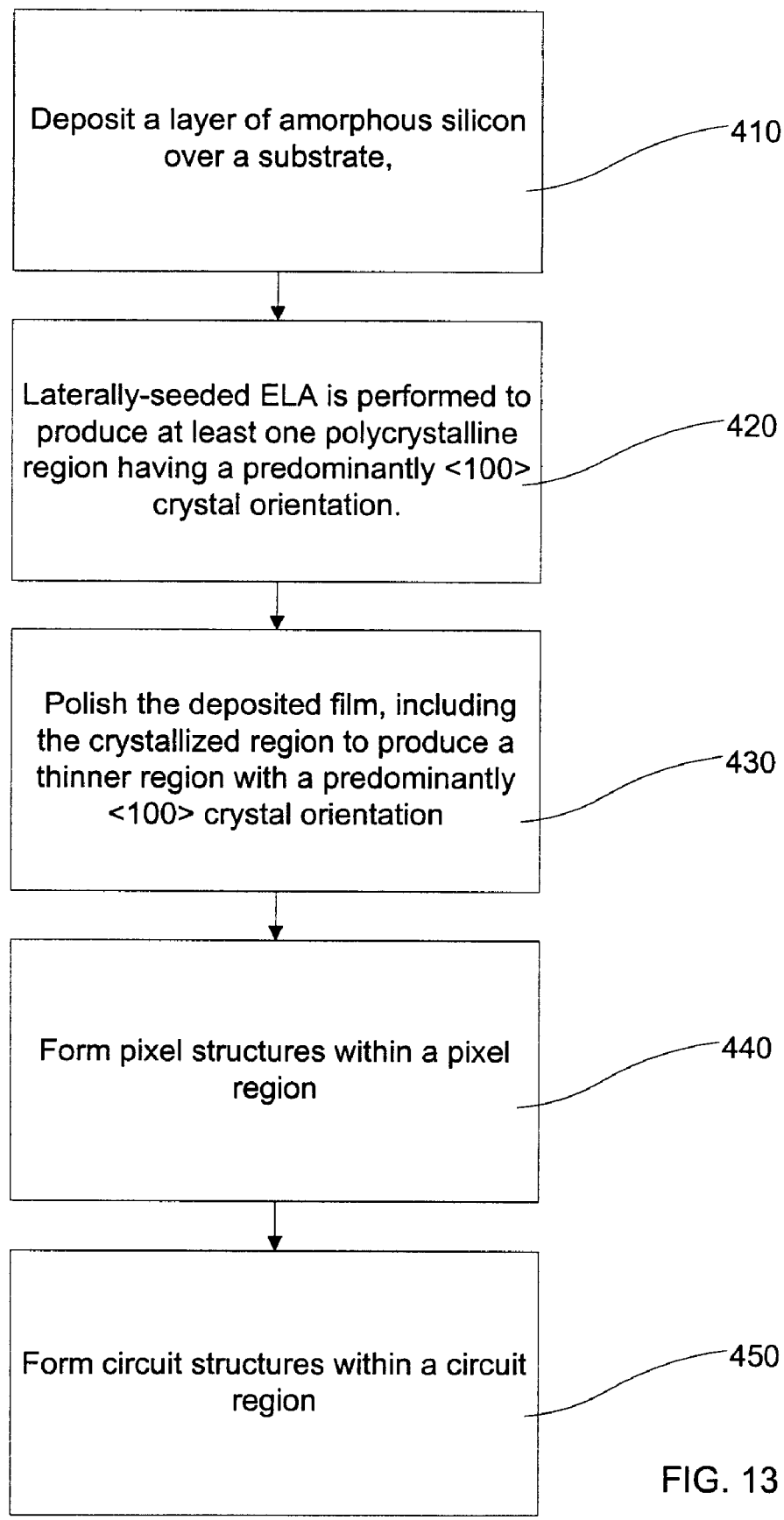
FIG. 13 is a flowchart of a process of performing the method of the present invention.

FIG. 13 is a flow chart of the steps of the method of the present invention is shown. Step 410 deposits a layer of amorphous silicon over the substrate. The layer of amorphous silicon should be thick enough to produce predominantly <100> polycrystalline silicon following subsequent processing according to the method of the present invention. The necessary thickness to produce a predominantly <100> polycrystalline material can be determined without undue experimentation. Preferably, the layer of amorphous silicon will be at least approximately 100 nm thick.

Step 420 performs lateral crystallization using LS-ELA to produce at least one polycrystalline region having a predominantly <100> crystal orientation. A laser beam is used to project an image of the mask onto the substrate. The laser beam energy is sufficient to cause amorphous silicon to crystallize. A sequence of laser pulses can be used to crystallize one, or more, regions, as described above. The resulting polycrystalline film is predominantly <100> crystal orientation, meaning within 15 degrees of <100> crystal orientation. Preferably, the crystal orientation is within 10 degrees of <100> crystal orientation.

Step 430 polishes the polycrystalline film, as well as any remaining amorphous film, to a desired thickness. To produce the desired crystal orientation thicker films are used than would be preferable for many applications. Polishing produces thin films with the desired crystalline orientation. For some applications, the step 430 of polishing is eliminated. This would reduce some of the processing cost while compromising overall performance.

Step 440 forms pixel structures, such as TFTs and capacitors, over a pixel region. For some applications the pixel region is amorphous silicon. For other applications, all, or a portion, of the pixel region will be <100> polycrystalline material as described above. The polycrystalline material could be used selectively underlying the TFTs, or underlying the entire pixel region.

Step 450 forms circuit structures over a circuit region. The circuit region could include row or column driver circuits. The circuit region could include more complex integrated circuits including logic for some applications. The circuit region will be <100> polycrystalline silicon.

The preceding description represents a few possible embodiments of the present invention. Additional variations within the scope of the present invention will be apparent to those skilled in the art. Accordingly, the invention is defined by the claims as follows.

What is claimed is:

1. A method of forming a liquid crystal display (LCD) on a substrate comprising the steps of;
    a) providing the substrate;
    b) depositing an amorphous silicon film at least 100 nm thick over the substrate;
    c) annealing at least one region of the amorphous silicon film using a sequence of laser pulses projected through a mask having a narrow slit to project a beamlet onto the surface of the amorphous silicon film to crystallize the amorphous silicon film as the beamlet is advanced over the surface of the amorphous silicon fun between successive laser pulses to produce at least one polycrystalline film region having a predominantly <100> crystallographic orientation;
    d) forming pixel structures over the amorphous silicon film; and
    e) forming circuit structures over at least one polycrystalline film region.

2. The method of claim 1, wherein the substrate is transparent.

3. The method of claim 2, wherein the substrate is quartz, glass or plastic.

4. The method of claim 1, wherein the amorphous silicon film is in the range of between approximately 100 and 250 nm thick.

5. The method of claim 1, wherein the polycrystalline film has a crystallographic orientation within 15 degrees of <100>.

6. The method of claim 1, wherein the polycrystalline film has a crystallographic orientation within 10 degrees of <100>.

7. The method of claim 1, further comprising the step of polishing at least one polycrystalline silicon film region.

8. The method of claim 7, wherein chemical mechanical polishing is used to accomplish the step of polishing.

9. The method of claim 7, wherein the at least one polycrystalline silicon film region is polished to a thickness of less than approximately 60 nm.

10. A method of forming a liquid crystal display (LCD) on a substrate comprising the steps of;
    a) providing the substrate;
    b) depositing an amorphous silicon film at least 100 nm thick over the substrate;

c) annealing at least one region of the amorphous silicon film using a sequence of laser pulses projected through a mask having a narrow slit to project a beamlet onto the surface of the amorphous silicon film to crystallize the amorphous silicon film as the beamlet is advanced over the surface of the amorphous silicon film between successive laser pulses to produce at least one polycrystalline film region having a predominantly <100> crystallographic orientation; and d) forming pixel structures over the at least one polycrystalline film region.

11. The method of claim 10, wherein the substrate is transparent.

12. The method of claim 11, wherein the substrate is quartz, glass or plastic.

13. The method of claim 10, wherein the amorphous silicon film is in the range of between approximately 100 and 250 nm thick.

14. The method of claim 10, wherein the polycrystalline film has a crystallographic orientation within 15 degrees of <100>.

15. The method of claim 10, wherein the polycrystalline film has a crystallographic orientation within 10 degrees of <100>.

16. The method of claim 10, further comprising the step of polishing at least one polycrystalline silicon film region.

17. The method of claim 16, wherein chemical mechanical polishing is used to accomplish the step of polishing.

18. The method of claim 16, wherein the at least one polycrystalline silicon film region is polished to a thickness of less than approximately 60 nm.

19. The method of claim 10, further comprising a circuit region over at least one polycrystalline film region.

20. A liquid crystal display (LCD) structure comprising:

a) a substrate;

b) a pixel region overlying the substrate; and c) a circuit region overlying the substrate, wherein the circuit region comprises a polycrystalline silicon film having a predominantly <100> crystallographic orientation.

21. The liquid crystal display (LCD) structure of claim 20, wherein the substrate is transparent.

22. The liquid crystal display (LCD) structure of claim 21, wherein the substrate is quartz, glass, or plastic.

23. The liquid crystal display (LCD) structure of claim 20, wherein the polycrystalline silicon film is at less than approximately 60 nm thick.

24. The liquid crystal display (LCD) structure of claim 20, wherein the polycrystalline silicon film is at least 100 nm thick.

25. The liquid crystal display (LCD) structure of claim 20, wherein the polycrystalline silicon film is in the range of between approximately 100 and 250 nm thick.

26. The liquid crystal display (LCD) structure of claim 20, wherein the pixel region comprises a polycrystalline silicon film having a predominantly <100> crystallographic orientation.

\* \* \* \* \*